(12) United States Patent
Keiter et al.

(10) Patent No.: US 11,882,112 B2
(45) Date of Patent: *Jan. 23, 2024

(54) INFORMATION SECURITY SYSTEM AND METHOD FOR PHISHING THREAT PREVENTION USING TOKENS

(71) Applicant: Bank of America Corporation, Charlotte, NC (US)

(72) Inventors: Kelly Renee-Drop Keiter, Waxhaw, NC (US); Michael Robert Young, Davidson, NC (US); Tomas Mata Castrejon, III, Fort Mill, SC (US); Rick Wayne Sumrall, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/330,580

(22) Filed: May 26, 2021

(65) Prior Publication Data

US 2022/0385648 A1    Dec. 1, 2022

(51) Int. Cl.
*G06F 7/04* (2006.01)
*H04L 9/40* (2022.01)

(52) U.S. Cl.
CPC ........ *H04L 63/083* (2013.01); *H04L 63/0876* (2013.01); *H04L 63/1483* (2013.01); *H04L 2463/082* (2013.01)

(58) Field of Classification Search
CPC ............... H04L 63/083; H04L 63/0876; H04L 63/1483; H04L 2463/082; H04L 9/0861; H04L 9/0863; H04L 9/3213; H04L 9/3228; H04L 63/0421; H04L 63/0414; H04L 63/04; G06F 21/31; G06F 21/552;
(Continued)

(56) References Cited

U.S. PATENT DOCUMENTS 7,181,764 B2    2/2007 Zhu et al.
7,188,358 B1 *  3/2007 Hisada .................. H04L 51/212
                                                       709/224
(Continued)

OTHER PUBLICATIONS

Pongchancai et al., Countermeasure Against Spoofed E-mails Using Display Name as a User Authenticator, IEEE, Jul. 13, 2018, pp. 1-6. (Year: 2018).*

(Continued)

*Primary Examiner* — Philip J Chea
*Assistant Examiner* — Jenise E Jackson

(57) ABSTRACT

A system for communicating email messages using tokens receives a request to send an email message to a receiver. The email message is associated with a sender's email address. The system determines whether the sender's email address is associated with a token from a plurality of tokens stored in a token-email address mapping table. The system generates a particular token for the sender's email address in response to determining that the sender's email address is not associated with a token, where the particular token uniquely identifies the sender's email address. The system sends the email message using the particular token instead of the sender's email address, such that the sender's email address remains anonymous from the perspective of the receiver.

14 Claims, 2 Drawing Sheets

(58) Field of Classification Search
CPC ...... G06F 21/577; G06F 21/60; G06F 21/606;
G06F 21/6245; G06F 21/6254
See application file for complete search history.

(56) References Cited

U.S. PATENT DOCUMENTS

| | | | |
|---|---|---|---|
| 7,290,035 B2 | 10/2007 | Mattathil | |
| 7,487,217 B2 | 2/2009 | Buckingham et al. | |
| 7,548,544 B2 | 6/2009 | Quinlan et al. | |
| 7,580,982 B2 | 8/2009 | Owen et al. | |
| 7,668,921 B2 | 2/2010 | Proux et al. | |
| 7,673,002 B1 | 3/2010 | Damarla | |
| 7,680,886 B1 | 3/2010 | Cooley | |
| 7,783,597 B2 | 8/2010 | Kirsch | |
| 7,865,561 B2 | 1/2011 | Kelly et al. | |
| 7,958,197 B2 | 6/2011 | Hughes et al. | |
| 8,176,126 B2 | 5/2012 | Davis et al. | |
| 8,255,468 B2 | 8/2012 | Vitaldevara et al. | |
| 8,359,649 B1 | 1/2013 | Sobel et al. | |
| 8,380,791 B1 | 2/2013 | Gordon et al. | |
| 8,468,348 B1 * | 6/2013 | Wasserman | H04L 67/02 713/168 |
| 8,522,347 B2 | 8/2013 | Yanovsky et al. | |
| 8,589,494 B2 | 11/2013 | Garrett | |
| 8,601,064 B1 | 12/2013 | Liao et al. | |
| 8,738,050 B2 | 5/2014 | Backholm et al. | |
| 8,745,143 B2 | 6/2014 | Vitaldevara et al. | |
| 8,751,808 B2 | 6/2014 | Gelbard et al. | |
| 8,782,184 B2 | 7/2014 | Furlong et al. | |
| 8,838,709 B2 | 9/2014 | Nussey et al. | |
| 8,856,239 B1 | 10/2014 | Oliver et al. | |
| 9,143,478 B2 | 9/2015 | Ramaswamy | |
| 9,154,514 B1 | 10/2015 | Prakash | |
| 9,223,998 B1 | 12/2015 | Grisso | |
| 9,313,170 B1 * | 4/2016 | Shoemaker | H04L 61/2503 |
| 9,369,437 B2 | 6/2016 | Holloway et al. | |
| 9,407,588 B2 | 8/2016 | Low et al. | |
| 9,442,881 B1 | 9/2016 | Narayan et al. | |
| 9,560,074 B2 | 1/2017 | Stemm et al. | |
| 9,736,149 B2 | 8/2017 | Bettenburg et al. | |
| 9,942,249 B2 | 4/2018 | Gatti | |
| 10,243,904 B1 | 3/2019 | Wescoe et al. | |
| 10,313,286 B2 | 6/2019 | Ordogh | |
| 11,405,379 B1 * | 8/2022 | Clauss | H04L 63/101 |
| 2004/0215721 A1 * | 10/2004 | Szeto | H04L 69/08 709/204 |
| 2004/0254990 A1 | 12/2004 | Mittal | |
| 2005/0091319 A1 | 4/2005 | Kirsch | |
| 2005/0216588 A1 | 9/2005 | Keohane et al. | |
| 2006/0031313 A1 | 2/2006 | Libbey et al. | |
| 2006/0041621 A1 | 2/2006 | Libbey | |
| 2008/0104180 A1 | 5/2008 | Gabe | |
| 2008/0177843 A1 | 7/2008 | Gillum et al. | |
| 2008/0184366 A1 | 7/2008 | Alperovitch et al. | |
| 2008/0270544 A1 | 10/2008 | Howe | |
| 2009/0063371 A1 | 3/2009 | Lin | |
| 2009/0094333 A1 | 4/2009 | Kyprianou | |
| 2009/0119376 A1 * | 5/2009 | Bomma | H04L 51/48 709/206 |
| 2009/0234663 A1 | 9/2009 | Mccann et al. | |
| 2009/0282112 A1 | 11/2009 | Prakash | |
| 2011/0196934 A1 * | 8/2011 | Sheer | H04L 67/1001 709/206 |
| 2011/0238765 A1 | 9/2011 | Wilson et al. | |
| 2011/0283359 A1 * | 11/2011 | Prince | H04L 67/146 726/23 |
| 2013/0046974 A1 * | 2/2013 | Kamara | G06F 21/6218 713/165 |
| 2013/0218983 A1 * | 8/2013 | Richard | H04W 12/02 455/411 |
| 2016/0004852 A1 * | 1/2016 | McEvoy | G06F 21/31 726/7 |
| 2017/0230323 A1 * | 8/2017 | Jakobsson | H04L 63/18 |
| 2017/0270517 A1 * | 9/2017 | Vasu | G06Q 20/4018 |
| 2017/0346851 A1 | 11/2017 | Drake | |
| 2018/0012000 A1 * | 1/2018 | Ogawa | G06F 21/34 |
| 2018/0198799 A1 * | 7/2018 | Parthasarathy | H04L 51/08 |

OTHER PUBLICATIONS

Ghafoor et al., CryptoNet: Design and Implementation of the Secure Email System, IEEE, May 22, 2009, pp. 1-6. (Year: 2009).*

* cited by examiner

INFORMATION SECURITY SYSTEM AND METHOD FOR PHISHING THREAT PREVENTION USING TOKENS

TECHNICAL FIELD

The present disclosure relates generally to information security, and more specifically to information security system and method for phishing threat prevention using tokens.

BACKGROUND

As communications using electronic mails ("emails") and text messages continue to be utilized by an ever-increasing number of users, so does fraudulent and criminal activity via such communications. It is challenging to determine whether an email or a text message is legitimate or associated with a fraudulent or social engineering attack. Social engineering attacks are becoming more prevalent, are growing in sophistication and can take different forms. For example, a "threat actor" can use an email address of an employee of a well-known and/or trusted organization, and send a deceptive email/text message to one or more unsuspecting users in an attempt to farm information and elicit the users to respond with personal information or other data that can be used to enable cyber crime or identity theft. The bad actor may include a link to a malicious website in the deceptive email/text message that directs the user to provide personal information.

SUMMARY

Current information security technologies are not configured to provide a reliable and efficient solution for phishing threat detection. This disclosure contemplates systems and methods for facilitating integrity of email communications. In some cases, a phishing threat may be originated from an email address that is impersonating or spoofing a trusted email address from an authentic source or sender. For example, a bad actor may gain unauthorized access to a trusted email address and use it to attempt to socially engineering a victim by sending illegitimate emails to others.

This disclosure contemplates mapping email addresses with tokens to pseudonymize the identity of the sender and receiver, and using tokens to facilitate the authentication of the email message, sender's email address, receiver's email address, the identity of the sender of the email message, and the identity of the receiver of the email message (e.g., the "who" and the "where" is authorized to send/receive the email). To this end, the disclosed system generates a one-time use token-email address mapping table. The token-email address mapping table comprises a plurality of email addresses, each associated with a particular token. Each token may comprise at least one of a set of numbers, a set of letters, and a set of symbols.

In one embodiment, the disclosed system may generate a token for an email address when the disclosed system receives a request from a first user (i.e., sender) to send an email message to a second user (i.e., a receiver). Once the disclosed system receives the request, the disclosed system generates a randomly-produced token uniquely identifying the email address of the sender, e.g., by implementing one or more random number, letter, and symbol generators. The disclosed system associates or links the token with the sender's email address. The disclosed system stores the sender's email address linked to the token in the token-email address mapping table. The generated token may be used once, such that after receiving an acknowledgement that the email message is received and accessed, the token is erased.

Upon generating the token, the disclosed system sends the email message using the token, such that the sender's email address is anonymous from the perspective of the receiver. In other words, the sender's email address is stored in the token-email address mapping table indicating that the email message is being sent from the sender to the receiver, and instead of exposing the sender's email address to the Internet and public network zone, the disclosed system uses the token to send the email message. As such, the sender's email address is kept secure from unauthorized access, and exposure to the Internet and bad actors. In this manner, the disclosed system may prevent phishing threats by the bad actors using the sender's email address.

The disclosed system may further be configured to detect phishing threats and phishing emails. To this end, the disclosed system may be associated with a server that is tasked to oversee the operations of computing devices that may receive communications including email messages. The disclosed system accesses an email message sent to a receiving computing device associated with a receiver of the email address. The disclosed system determines whether the sender's email address is associated with a token from a plurality of tokens stored in the token-email address mapping table. The disclosed system determines that the email message and/or email address is associated with an authorized sender (i.e. is not a threat actor), in response to determining that the sender's email address is not associated with a token from the plurality of tokens stored in the token-email address mapping table. Otherwise, the disclosed system determines that the email message and/or email address is not associated with an authorized sender (i.e. the sender of the email message is a threat actor). The system generates a message to sender (and intended receiver) indicating the request cannot be processed as authorization could not be verified (i.e. a 401 Unauthorized message). In this manner, the disclosed system is configured to detect phishing threats.

With respect to a system for phishing threat detection, in one embodiment, a system for identifying email messages associated with phishing threats comprises a memory and a processor. The memory is operable to store a randomized set of token-email address mapping table comprising a plurality of email addresses mapped to a plurality of tokens (which can be both access tokens and refresh tokens). The token-email address mapping table may be stored in a secure database, such as a vault protected by a firewall. Each of the plurality of email addresses is associated with a different token from the plurality of tokens. Each of the plurality of tokens uniquely identifies a different email address from the plurality of email addresses. The processor is operably coupled with the memory. The processor accesses an email message sent to a receiving computing device associated with a receiver of the email message, where the email message is associated with a sender's email address. The processor determines whether the sender's email address is associated with a token from the plurality of tokens by searching for the sender's email address within the token-email address mapping table. In response to determining that the sender's email address is not associated with a token from the plurality of tokens, the processor determines that the email message is associated with a phishing threat.

With respect to a system for phishing threat prevention, in one embodiment, a system for communicating email messages using tokens comprises a memory and a processor.

The memory is operable to store a token-email address mapping table comprising a plurality of email addresses mapped to a plurality of tokens (which can be access tokens and refresh tokens). Each of the plurality of email addresses is associated with a different token from the plurality of tokens. Each of the plurality of tokens uniquely identifies a different email address from the plurality of email addresses. The processor is operably coupled with the memory. The processor receives a request to communicate an email message to a receiver, where the email message is associated with a sender's email address. The processor determines whether the sender's email address is associated with a token from the plurality of tokens. In response to determining that the sender's email address is not associated with a token from the plurality of tokens, the processor generates a particular token for the sender's email address, where the particular token uniquely identifies the sender's email address. The processor communicates the email message using the particular token instead of the sender's email address, such that the sender's email address remains anonymous from the perspective of the receiver.

The disclosed system provides several practical applications and technical advantages, which include: 1) technology that generates a pseudonymized token-email address mapping table, in response to receiving requests from senders to send email messages to their respective receivers; 2) technology that uses a token for sending an email message, such that an email address of the sender of the email message is anonymous from the perspective of the receiver; 3) technology that detects whether an email message is associated with a phishing threat by determining whether a sender's email address from which the email message is sent is associated with a token from among tokens in the token-email address mapping table; 4) technology that blocks email messages associated with an email address in response to determining that the email address is associated with a phishing threat; and 5) technology that prevents phishing threats by communicating email messages using tokens instead of email addresses, thus, the email addresses are kept secure from unauthorized access.

As such, the disclosed system may improve phishing threat detection technologies by implementing 1) systems and methods for phishing threat detection by verifying tokens used to send email messages; and 2) systems and methods for phishing threat prevention by using tokens instead of email addresses to send email messages. Accordingly, the disclosed system may be integrated into a practical application of securing email addresses from unauthorized access. Thus, bad actors are not able to access the email address and send phishing email messages.

This, in turn, provides an additional practical application of securing computing devices that would overwise receive email messages associated with phishing threats using the current phishing threat detection technologies. For example, by blocking the email messages associated with phishing threats, the receiving computing devices are kept secure from unauthorized access, and thus, from data extraction, exfiltration, modification, destruction, etc.

The disclosed system may further be integrated into an additional practical application of improving underlying operations of the receiving computing devices. For example, malware that may be attached to an email message associated with a phishing threat, i.e., phishing email, is blocked by a firewall configuration configured to block communications associated with email addresses associated with phishing threats. In another example, a malicious link within an email message associated with a phishing threat may be linked to malware and/or linked to a malicious code that is launched or executed in response to clicking on the malicious link. Thus, the receiving computing device may be infected by the malware and/or malicious code. In another example, the disclosed system may reduce processing, memory, and time resources for phishing threat detection that would otherwise be spent using the current phishing domain detection technologies. For example, by detecting and blocking communications (e.g. email messages) associated with phishing threat, a memory of a receiving computing device (e.g., a server) may not have to store such communications. In another example, a processor of the receiving computing device may not have to process such communications. The disclosed system may further be integrated into an additional practical application of securing confidential information (e.g., login credentials, etc.) associated with senders and receivers of email messages.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for detecting phishing threats. This disclosure provides various systems and methods for phishing threat detection and prevention using tokens. In one embodiment, system 100 and method 200 for phishing threat detection using tokens are described in FIGS. 1 and 2, respectively. In one embodiment, system 100 and method 300 for phishing threat prevention using tokens are described in FIGS. 1 and 2, respectively.

Example System for Phishing Threat Detection and Prevention Using Tokens

Figure 1:
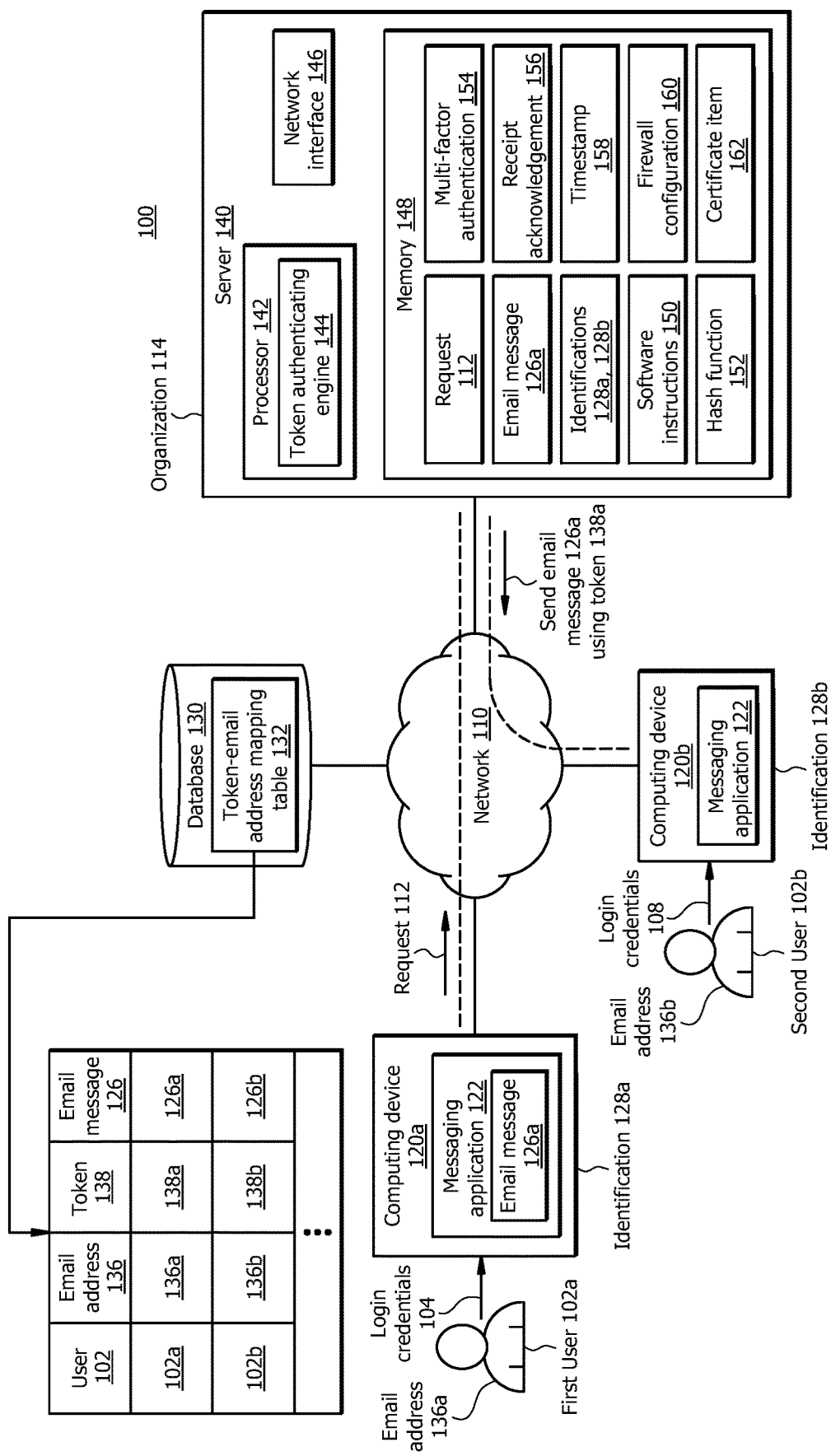
FIG. 1 illustrates an embodiment of a system configured for phishing threat detection and prevention using tokens.

FIG. 1 illustrates one embodiment of a system 100 that is configured to detect phishing threats using tokens 138. In one embodiment, system 100 comprises a server 140. In some embodiments, system 100 further comprises a network 110, one or more computing devices 120 (e.g., computing devices 120*a* and 120*b*), and a database 130. Network 110 enables communications between the components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes a token authentication engine 144 to determine whether an email message 126 is associated with a phishing threat or not. In other words, the token authentication engine 144 determines whether an email message 126 is sent from an authorized, authenticated, and/or verified user 102. In other examples, the token authentication engine 144 determines whether an email message 126 is sent to an authorized, authenticated, and/or verified user 102. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each of the computing devices 120a and 120b is generally any device that is configured to process data and interact with users 102, e.g., users 102a and 102b. Examples of computing devices 120a and 120b include, but are not limited to, a personal computer, a desktop computer, a workstation, a server, a laptop, a tablet computer, a mobile phone (such as a smartphone), etc. Each of the computing devices 120a and 120b may include a user interface, such as a display, a microphone, keypad, or other appropriate terminal equipment usable by a user 102. Each computing device 120 may include a hardware processor, memory, and/or circuitry configured to perform any of the functions or actions of the computing device 120 described herein. For example, each computing device 120 may store a software application designed using software code that may be stored in the memory and executed by the processor to perform the functions of the computing devices 120.

The first user 102a may send and receive email messages 126 from and to the computing device 120a. For example, the first user 102a may send an email message 126a using the messaging application 122 from the computing device 120a. For example, the first user 102a may want to send the email message 126a to the second user 102b. To this end, the first user 102a may first be verified using an multi-factor authentication 154. The multi-factor authentication 154 may include two or more of 1) verifying a token 138a associated with the email address 136a of the user 102a, 2) verifying login credentials 104 associated with the user 102a, 3) verifying a passcode sent to computing device 120a (by the processor 142 from the server 140), 4) verifying biometric features of the user 102a, such as fingerprint features, facial features, pose estimation features, and voice features extracted from captured fingerprint, image, video, and voice of the user 102a via a fingerprint scanner, a camera, a microphone, respectively, and 5) verifying an identification 128a associated with the computing device 120a. For example, the identification 128a may include one or more of an Internet Protocol (IP) address, a Media Access Control (MAC) address, International Mobile Subscriber Identity (IMSI), International Mobile Station Equipment Identity (IMEI), and a serial number associated with the computing device 120a. In one embodiment, the token authentication engine 144 may perform the multi-factor authentication 154 to verify the identity of the user 102a.

Upon verifying the identity of the user 102a, the user 102a may log in to their account on the messaging application 122 using their login credentials 104. The user 102a may then send to the server 140 a request 112 indicating that they want to send an email message 126a to the user 102b.

The token authentication engine 144 processes the request 112. This process is described in detail further below in conjunction with the operational flow of the system 100 and method 300 described in FIG. 3.

The second user 102b may send and receive email messages 126 from and to the computing device 120b on the messaging application 122. To this end, the user 102b may first be verified using the multi-factor authentication 154, similar to that described above with respect to verifying the user 102a. In addition to the authentication methods of the multi-factor authentication 154 listed above for verifying the user 102a, the multi-factor authentication 154 for verifying the user 102b may further include verifying a token 138a associated with the user 102a, email address 136a, and/or email message 126a.

Upon verifying the identity of the user 102b, the user 102b may log in to their account on the messaging application 122 using their login credentials 108. The user 102b may access the email message 126a sent from the user 102a, if the token authentication engine 144 verifies the identity of the user 102, and that the email address 136a of the user 102a is associated the token 138a. This process is described in detail further below in conjunction with the operational flow of the system 100 and method 200 described in FIG. 2.

Database 130 generally comprises any storage architecture. Examples of database 130 include, but are not limited to, a network-attached storage cloud, a storage area network, and a storage assembly directly (or indirectly) coupled to one or more components of the system 100. The database 130 may include a vault that is protected by a firewall. The database 130 stores a token-email address mapping table 132. The token-email address mapping table 132 comprises a plurality of email addresses 136, each mapped with a particular token 138. For example, email addresses 136 of each user 102, such as the user 102a and the user 102b, is associated with a particular token 138. For example, the email address 136a is mapped or associated with the token 138a, and the email address 136b is mapped or associated with the token 138b. Each token 138 uniquely identifies its corresponding email address 136 and/or email message 126. In one embodiment, each token 138 may comprise a least one of a set of numbers, a set of letters, and a set of symbols. Each token 138 may include an access token 138 and/or a refresh token 138. The access token 138 may be used to verify that a user 102 is authorized to send and/or receive an email message 126. The access token 138 may have a limited lifetime, and used only once. Thus, a bad actor is not able to access the access token 138. The refresh token 138 may allow the token authentication engine 144 to generate a new access token 138 without prompting the user 102.

The token 138 may be pseudonymized, such that it cannot be attributed to a specific user 102, email address 136, and email message 126 by an outsider (e.g., threat actor). The token authentication engine 144 may perform pseudonymization of the tokens 138 by implementing the hash function 152, by which personally identifiable information fields within an email address 136 and/or email message 126 are replaced by one or more artificial identifiers or pseudonyms, e.g., tokens 138 that include random numbers, letters, symbols.

The tokens 138 are configurable, such that a particular token 138 is only active during the process of sending an email message 126 associated with its corresponding email address 136. For example, the token 138a is active from a first timestamp 158 when the email message 126a is generated at its originating computing device (e.g., computing device 120a) until a second timestamp 158 of its receipt at its destination (e.g., computing device 120b) and/or until a timestamp 158 of the token authentication engine 144 receiving a receipt acknowledgement 156 that the email message 126a is received and accessed. The token authentication engine 144 may expire and/or erase the token 138a when the receipt acknowledgement 156 is received at the server 140 from the designated destination of the email message 126a, e.g., computing device 120b.

Similarly, assume that the user 102b is sending an email message 126b. The token authentication engine 144 generates the token 138b for the email address 136b, and stores it in the token-email address mapping table 132. The token 138b is active from a third timestamp 158 when the email message 126b is generated at its originating computing device (e.g., computing device 120b) until a fourth timestamp 158 of its receipt at its destination and/or until a timestamp of the token authentication engine 144 receiving a receipt acknowledgement 156 that the email message 126b is received and accessed.

Server

Server 140 is generally a server or any other device configured to process data and communicate with computing devices (e.g., computing devices 120a and 120b), databases, etc., via the network 110. In one example, the server 140 may include or be communicatively coupled with Domain Name System (DNS) servers each associated with the computing devices 120a and 120b, respectively. The server 140 is generally configured to oversee operations of the token authentication engine 144, as described further below in conjunction with an operational flow of system 100, method 200 described in FIG. 2, and method 300 described in FIG. 3.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the token authentication engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 200 as described in FIG. 2 and method 300 described in FIG. 3.

Network interface 146 is configured to enable wired and/or wireless communications (e.g., via network 110). The network interface 146 is configured to communicate data between the server 140 and other devices (e.g., computing devices 120a and 120b), databases (e.g., database 130), systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the request 112, email message 126a, identifications 128a and 128b, software instructions 150, hash function 152, multi-factor authentication 154, receipt acknowledgements 156, timestamps 158, firewall configuration 160, certificate item 162, and/or any other data or instructions. The software instructions 150 may comprise any suitable set of instructions, logic, rules, or code operable to execute the processor 142.

Token Authentication Engine

Token authentication engine 144 may be implemented by the processor 142 executing software instructions 150, and is generally configured to 1) generate the token-email address mapping table 132; 2) determine whether an email message 126 is associated with a token 138; and 3) determine whether the token 138 is active. Each of these processes are described in detail further below in conjunction with the operational flow of the system 100 and methods 200 (see FIG. 2) and 300 (see FIG. 3).

In brief, in one embodiment, the token authentication engine 144 may be configured to generate the token-email address mapping table 132. For example, when a first user 102a wants to send an email message 126a, the first user 102a may send a request 112 to the token authentication engine 144 indicating that they want to send an email message 126a to a second user 102b. The token authentication engine 144 generates a token 138a, and associates, maps, or links the token 138a to the email message 126a and/or the email address 136a of the first user 102a. The token authentication engine 144 stores the email address 136a mapped with the generated token 138a and the email message 126a in the token-email address mapping table 132. In this manner, the token authentication engine 144 may populate the token-email address mapping table 132 when each user 102 wants to send an email message 126. In one embodiment, the token 138a may comprise a least one of a set of numbers, a set of letters, and a set of symbols.

In one embodiment, the token authentication engine 144 may generate the token 138a by executing one or more of a random number generator, a random string generator, and a random symbol generator. In one embodiment, the token authentication engine 144 may generate the token 138a by executing a hash function 152. In one embodiment, the token authentication engine 144 may implement a natural language processing algorithm to extract features from the email address 136a and/or the email message 126a, and use the extracted features to generate a unique token 138a. In other embodiments, the token authentication engine 144 may generate the token 138a by implementing any other suitable tokenization algorithm.

The token authentication engine 144 may generate other tokens 138 by any of the methods described above. The token authentication engine 144 may execute the hash function 152 for mapping the email addresses 136 with tokens 138. The token authentication engine 144 may use the hash function 152 to search for a particular token 138 and/or email address 136 in the token-email address mapping table 132. For example, the token authentication engine 144 may search the token-email address mapping table 132 to determine whether a particular email address 136 is associated with a particular token 138 and/or vice versa.

For example, assume that the token authentication engine 144 has accessed the particular email message 126a sent to the second user 102b, and the particular email message 126 is associated with the particular email address 136a associated with the sender of the particular email message 126a (e.g., user 102a). In this example, if the token authentication engine 144 determines that the particular email address 136a is associated with the particular token 138a from the plurality of tokens 138 in the token-email address mapping table 132, the token authentication engine 144 determines that the particular email address 136a is not associated with a phishing threat. Otherwise, the token authentication engine 144 determines that the particular email address 136a is associated with a phishing threat. This process is described in more detail in conjunction with the operational flow of the system 100 and methods 200 (see FIG. 2) and 300 (see FIG. 3). The phishing threat generally includes or associated with fraudulent, malicious, or phishing content. In one example, once a user 102 accesses an email message 126 associated with a phishing threat (i.e., spoofing or phishing email), the user may be elicited to provide login credentials, personal information, confidential information, and/or financial account information (also collectively referred to herein as "private information"). The private information may be used at the expense of the user. In another example, the phishing email may contain a link that upon access, a malicious code may be executed at the computing device 120, and thus, extracting, destroying, exfiltrating, and/or modifying data stored at the computing device 120. In another example, the phishing email may be attached with a malicious file, such as malware that upon access, may execute a malicious code to extract, destroy, exfiltrate, and/or modify data stored at the computing device 120. Thus, by detecting whether an email message 126 is associated with a phishing threat, data stored at the receiving computing device 120 may be kept secure from unauthorized access, and thus, from extraction, destruction, exfiltration, and/or modification.

Operational Flow

Using a Token for Sending an Email Message

The operational flow of the system 100 begins when the first user 102a wants to send an email message 126a to the second user 102b. The token authentication engine 144 may verify the identity of the first user 102a by implementing the multi-factor authentication 154, similar to that described above. Upon verifying the identity of the first user 102a, the first user 102a may login to their account on the messaging application 122 to compose the email message 126a. The first user 102a sends a request 112 to the server 140 indicating that the first user 102a wants to send the email message 126a to the second user 102b. The token authentication engine 144 receives the request 112, and determines whether the email address 136a associated with the first user 102a is mapped to a token 138 by searching for the email address 136a in the token-email address mapping table 132.

In one embodiment, if the token authentication engine 144 determines that the email address 136a is not associated with a token 138, the token authentication engine 144 generates a token 138a, similar to that described above. In one embodiment, the token authentication engine 144 may generate a different token 138 each time the first user 102a sends a request 112 for sending a different email message 126.

The token authentication engine 144 may use the generated token 138a to send the email message 126a to the second user 102b, such that the email address 136a is anonymous from the perspective of the second user 102b and, thus, bad actors who are trying to use the email address 136a to impersonate the first user 102a and send phishing or spoofing emails. In this manner, the email address 136a is kept secure from unauthorized access, such that the token 138a is used for sending the email message 126a instead of the email address 136a.

Verifying Whether a Received Email Message is Associated with a Phishing Threat

For example, assume that a second instance of the server 140 is configured to monitor incoming communications to the computing device 120b. Also, assume that an email message 126a has arrived at the server 140 and is directed to the second user 102b operating the computing device 120b. The token authentication engine 144 accesses the email message 126a, for example, by intercepting the email message 126a before the email message 126a has arrived at the computing device 120b.

The token authentication engine 144 determines that the email message 126a is associated with the email address 136a. The token authentication engine 144 determines whether the email address 136a is associated with a token 138 by searching for the email address 136a in the token-email address mapping table 132. The token authentication engine 144 may use the hash function 152 to determine whether the email address 136a is associated with a token 138. By searching the token-email address mapping table 132, the token authentication engine 144 determines that the email address 136a is associated with the token 138a. Thus, the token authentication engine 144 determines that the email address 136a and/or email message 126a is not associated with a phishing threat and, thus determines that the sender of the email message 126a (i.e., user 102a) is verified, authenticated, and authorized to send the email message 126a to user 102b.

For example, assume that the token authentication engine 144 does not find the email address 136a in the token-email address mapping table 132 or finds the email address 136a in the token-email address mapping table 132 but determines that it is not associated with the token 138a. In this case, the token authentication engine 144 determines that the email address 136a is associated with a phishing threat. In other words, the token authentication engine 144 determines that the email address 136a and/or the email message 126a are not associated with a verified, authenticated, and authorized sender (i.e., user 102a). In this case, the token authentication engine 144 may generate and send a message to the sender (i.e., the user 102a) and the intended receiver (i.e., the user 102b) indicating that the request 112 cannot be processed as authorization of the email message 126a and/or email address 136a could not be verified (e.g., a 401 Unauthorized message).

In one embodiment, the token authentication engine 144 may be configured to determine whether any communication is associated with a phishing threat. For example, the token authentication engine 144 may determine whether a message from a web site, a popup notification, a text message (e.g., a Short Message Service (SMS) message), a social media post, and/or the like are associated with a phishing threat. For example, the token authentication engine 144 may determine whether a domain associated with a website from which a message is originated is associated with a token 138. In response to determining that the domain of the website is associated with a token 138, the token authentication engine 144 may determine that the incoming message from the website is not associated with a phishing threat. In other examples, the token authentication engine 144 may determine that a phone number, a social media account, an identification (e.g., IP address, MAC address, IMSI, IMEI, serial number, and/or the like) associated with a computing device from which a communication is being sent is associated with a token 138.

Although, FIG. 1 illustrates that one server 140 receives requests 112, generates tokens 138, sends email messages 126, and determines whether or not an email message 126 (e.g., email message 126a) is associated with a phishing threat, one of ordinary skill in the art appreciates other embodiments in light of the present disclosure.

In some embodiments, a first server (e.g., a first instance of a server 140) that is tasked to oversee communications of the computing device 120a may receive the request 112 from the computing device 120a, and send the email message 126a to the computing device 120b; and a second server (e.g., a second instance of a server 140) that is tasked to oversee communications of the computing device 120b determines whether the email message 126a is associated with a phishing threat.

Example Method for Phishing Threat Detection

Figure 2:
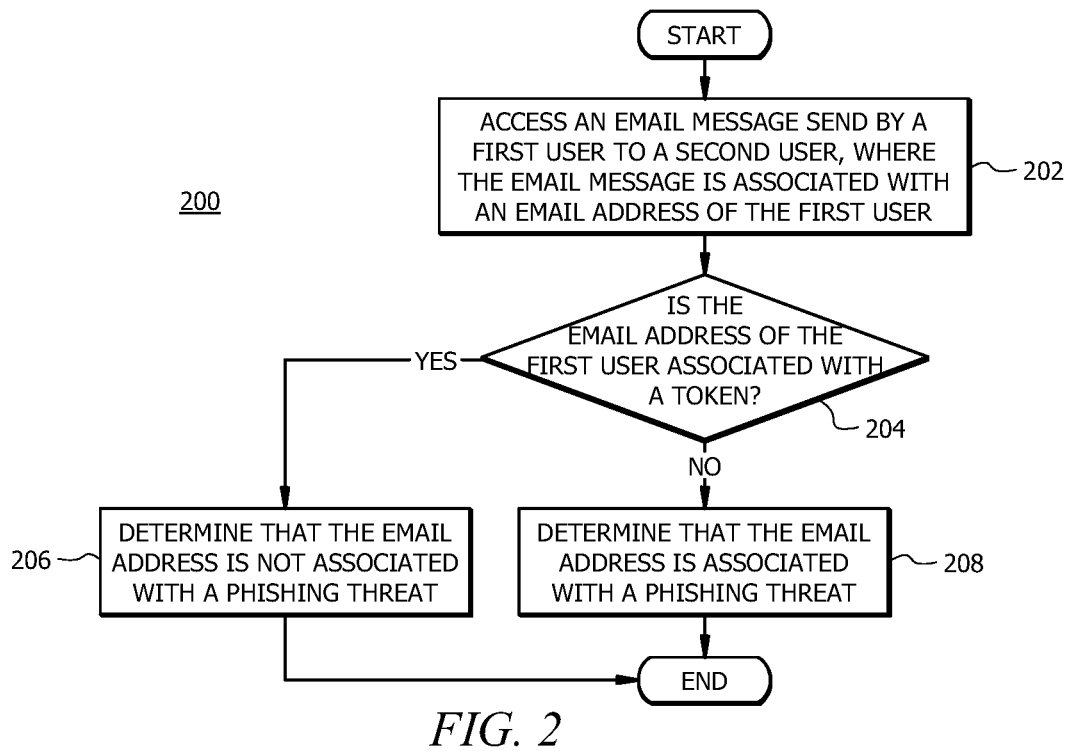
FIG. 2 illustrates an example flowchart of a method for phishing threat detection using tokens.

FIG. 2 illustrates an example flowchart of a method 200 for phishing threat detection. Modifications, additions, or omissions may be made to method 200. Method 200 may include more, fewer, or other steps. For example, steps may be performed in parallel or in any suitable order. While at times discussed as the system 100, processor 142, token authentication engine 144, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-208.

Method 200 begins at step 202 where the token authentication engine 144 accesses an email message 126a sent by a first user 102a to a second user 102b. For example, assume that the first user 102a has composed the email message 126a to be sent to the second user 102b. Thus, the email message 126a is associated with the email address 136a of the first user 102a. The token authentication engine 144 may intercept the email message 126a before the email message 126a arrives at the computing device 120b or is accessed at the computing device 120b by the second user 102b.

At step 204, the token authentication engine 144 determines whether the email address 136a of the first user 102a is associated with a token 138. In this process, the token authentication engine 144 searches the token-email address mapping table 132 to determine whether the email address 136a is associated with a token 138. For example, assume that the token authentication engine 144 determines that the email address 136a is associated with the token 138a by searching the token-email address mapping table 132. In this case, method 200 proceeds to step 206. Otherwise, if the token authentication engine 144 determines that email address 136a is not associated with the token 138a, method 200 proceeds to step 208.

At step 206, the token authentication engine 144 determines that the email address 136a (and/or email message 126a) is not associated with a phishing threat. In this case, the token authentication engine 144 may forward the email message 126a to the computing device 120b to be accessed by the second user 102b.

The second user 102b may access the email message 126a in response to being verified by the multi-factor authentication 154, similar to that described above in FIG. 1. For example, assume that the second user 102b is a customer or client of an organization 114 associated with the server 140 and the token authentication engine 144. Also, assume that the first user 102a is an employee of the organization 114.

In one example, if the second user 102b has opted-in to polices set by the organization 114 (i.e., subscribed to the services of the organization 114), the second user 102b may access the email message 126a, such that a non-replicable certificate item 162 is attached, associated with, and/or displayed along with the email message 126a and/or the email address 136a, where the non-replicable certificate item 162 indicates that the email address 136a and the email message 126a are not associated with a phishing threat. In this example, if the second user 102b has not opted-in to the policies set by the organization 114, the email address 136a may be anonymous from the perspective of the second user 102b. For example, the email address 136a may be masked. In another example, an alias may be used instead of the email address 136a. In other examples, the email address 136a may remain anonymous from the perspective of the second user 102b in any other suitable method, e.g., encrypted, hashed, etc. In one embodiment, the second user 102b may opt-in to the policies of organization 114 when the second user 102b becomes a client or customer of the organization 114.

In one embodiment, even if the second user 102b is not a client or customer of the organization 114, the second user 102b may opt-in to the policy set by the organization 114 by clicking on a link on the email address 136a and/or within the email message 126a, and indicating their agreement to the polices displayed on a text file. By agreeing to the policies of the organization 114, the email address 136a may be revealed for the second user 102b. In this manner, the email address 136a may remain anonymous from external entities, such as non-customers, non-clients, untrusted entities, and/or the like. Thus, the email address 136a may kept secure from unauthorized access by bad actors.

At step 208, the token authentication engine 144 determines that the email address 136a (and/or email message 126a) is associated with a phishing threat. In other words, the token authentication engine 144 determines that the email address 136a and/or the email message 126a are not associated with a verified, authenticated, and authorized sender (i.e., user 102a). In response the determining that the email address 136a (and/or email message 126a) is associated with a phishing threat, the token authentication engine 144 may block the email message 126a from being routed to the computing device 120b and accessed by the second user 102b. The token authentication engine 144 may further implement a firewall configuration 160 indicating that future communications from the email address 136a to be blocked.

Example Method for Phishing Threat Prevention

Figure 3:
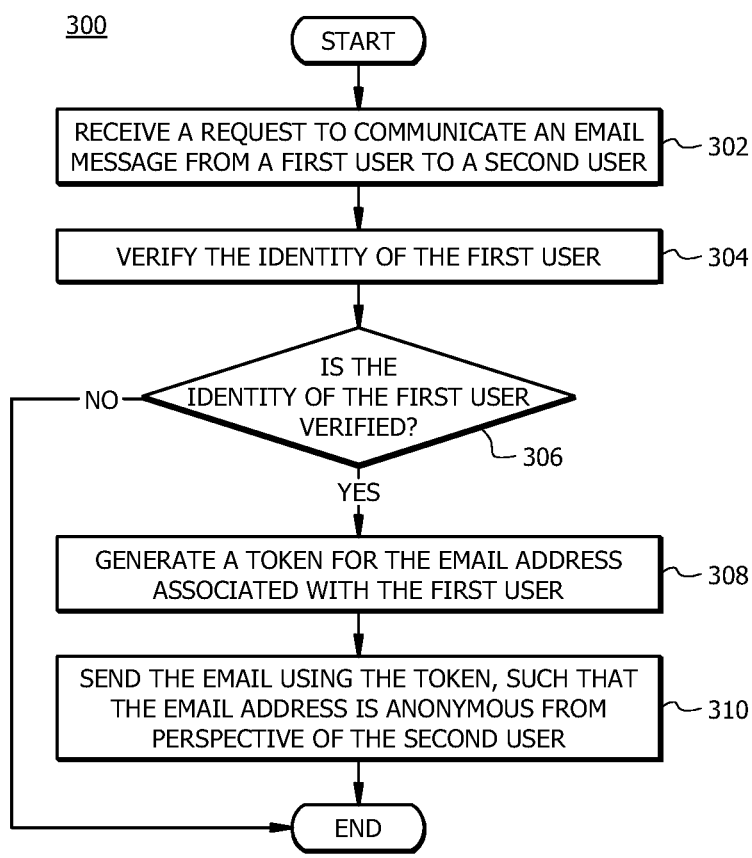
FIG. 3 illustrates an example flowchart of a method for phishing threat prevention using tokens.

FIG. 3 illustrates an example flowchart of a method 300 for phishing threat prevention. Modifications, additions, or omissions may be made to method 300. Method 300 may include more, fewer, or other steps. For example, steps may be performed in parallel or in any suitable order. While at times discussed as the system 100, processor 142, token authentication engine 144, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-310.

Method 300 begins at step 302 where the token authentication engine 144 receives a request 112 to communicate an email message 126a from a first user 102a to a second user 102b. For example, the token authentication engine 144 may receive the request 112 from the computing device 120a.

At step 304, the token authentication engine 144 verifies the identity of the first user 102a. For example, the token authentication engine 144 may perform the multi-factor authentication 154 to verify the identity of the first user 102a, similar to that described in FIG. 1.

At step 306, the token authentication engine 144 determines whether the identity of the first user 102a is verified. If the token authentication engine 144 verifies the identity of the first user 102a, method 300 proceeds to step 308. Otherwise, method 300 terminates.

At step 308, the token authentication engine 144 generates a token 138a for the email address 136a associated with the first user 102a. For example, the token authentication engine 144 may generate the token 138a by executing one or more of a random number generator, a random string generator, and a random symbol generator. In another example, the token authentication engine 144 may generate the token 138a by implementing a natural language processing to extract features from the email address 136a and/or the email message 126a, and use the extracted features to generate a unique token 138a. In another example, the token authentication engine 144 may generate the token 138a by implementing the hash function 152 and/or hash algorithm. Other examples of generating the token 138a are described in FIG. 1.

At step 310, the token authentication engine 144 sends the email message 126a using the token 138a, such that the email address 136a is anonymous from the perspective of the second user 102b. For example, the token authentication engine 144 may use the token 125a for sending the email message 126a instead of using the email address 136a, similar to that described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for communicating email messages using tokens, comprising:
a memory operable to store a token-email address mapping table comprising a plurality of email addresses mapped to a plurality of tokens, wherein:
each of the plurality of email addresses is associated with a different token from the plurality of tokens, and
each of the plurality of tokens uniquely identifies a different email address from the plurality of email addresses; and
a processor, operably coupled with the memory, and configured to:
receive a request to communicate an email message to a receiver, wherein the email message is associated with a sender's email address;
determine whether the sender's email address is associated with a token from the plurality of tokens;
in response to determining that the sender's email address is not associated with a token from the plurality of tokens, generate a particular token for the sender's email address, wherein the particular token uniquely identifies the sender's email address; and
communicate the email message using the particular token instead of the sender's email address, such that the sender's email address remains anonymous from the perspective of the receiver, wherein the particular token is used once such that after receipt of the email message the particular token is erased;
a second processor configured to:
access the email message;
determine whether the sender's email address is associated with the particular token by searching for the sender's email address within the token-email address mapping table; and
in response to determining that the sender's email address is associated with the particular token, determine that the email message is not associated with a phishing threat.

2. The system of claim 1, wherein the particular token comprises at least one of a set of numbers, a set of letters, and a set of symbols.

3. The system of claim 1, wherein the processor is further configured to, in response to receiving the request to communicate the email message, verify the identity of a sender by performing a multi-factor authentication.

4. The system of claim 3, wherein the multi-factor authentication comprises at least two of:
verifying login credentials associated with the sender;
verifying a passcode sent to a sending computing device from which the email message is communicated; and
verifying an identification associated with the sending computing device, wherein the identification comprises an Internet Protocol (IP) address, a Media Access Control (MAC) address, or a serial number associated with the sending computing device.

5. The system of claim 1, wherein the email message comprises intercepting the email message before the email message arrives at the receiving computing device.

6. A method for communicating email messages using tokens, comprising:
   receiving a request to communicate an email message to a receiver, wherein the email message is associated with a sender's email address;
   determining whether the sender's email address is associated with a token from a plurality of tokens stored in a token-email address mapping table, wherein:
      the token-email address mapping table comprising a plurality of email addresses mapped to the plurality of tokens,
      each of the plurality of email addresses is associated with a different token from the plurality of tokens, and
      each of the plurality of tokens uniquely identifies a different email address from the plurality of email addresses;
   accessing, by a server associated with a receiving computing device to which the email message is sent, the email message;
   determining whether the sender's email address is associated with the particular token by searching for the sender's email address within the token email address mapping table; and
   in response to determining that the sender's email address is associated with the particular token,
   determining that the email message is not associated with a phishing threat;
   in response to determining that the sender's email address is not associated with a token from the plurality of tokens, generating a particular token for the sender's email address, wherein the particular token uniquely identifies the sender's email address; and
   communicating the email message using the particular token instead of the sender's email address, such that the sender's email address remains anonymous from the perspective of the receiver, wherein the particular token is used once such that after receipt of the email message the particular token is erased.

7. The method of claim 6, wherein the particular token comprises at least one of a set of numbers, a set of letters, and a set of symbols.

8. The method of claim 6, further comprising, in response to receiving the request to communicate the email message, verifying the identity of a sender by performing a multi-factor authentication.

9. The method of claim 8, wherein the multi-factor authentication comprises at least two of:
   verifying login credentials associated with the sender;
   verifying a passcode sent to a sending computing device from which the email message is communicated; and
   verifying an identification associated with the sending computing device, wherein the identification comprises an Internet Protocol (IP) address, a Media Access Control (MAC) address, or a serial number associated with the sending computing device.

10. The method of claim 6, wherein accessing the email message comprises intercepting the email message before the email arrives at the receiving computing device.

11. A non-transitory computer-readable medium storing instructions that, when executed by a processor, causes the processor to:
   receive a request to communicate an email message to a receiver, wherein the email message is associated with a sender's email address;
   determine whether the sender's email address is associated with a token from a plurality of tokens stored in a token-email address mapping table, wherein:
      the token-email address mapping table comprising a plurality of email addresses mapped to the plurality of tokens,
      each of the plurality of email addresses is associated with a different token from the plurality of tokens, and
      each of the plurality of tokens uniquely identifies a different email address from the plurality of email addresses;
   accessing, by a server associated with a receiving computing device to which the email message is sent, the email message;
   determining whether the sender's email address is associated with the particular token by searching for the sender's email address within the token-email address mapping table; and
   in response to determining that the sender's email address is associated with the particular token, determining that the email message is not associated with a phishing threat; and
   in response to determining that the sender's email address is not associated with a token from the plurality of tokens, generate a particular token for the sender's email address, wherein the particular token uniquely identifies the sender's email address; and
   communicate the email message using the particular token instead of the sender's email address, such that the sender's email address remains anonymous from the perspective of the receiver, wherein the particular token is used once such that after receipt of the email message the particular token is erased.

12. The non-transitory computer-readable medium of claim 11, wherein the particular token comprises at least one of a set of numbers, a set of letters, and a set of symbols.

13. The non-transitory computer-readable medium of claim 11, wherein the instructions when executed by the processor, further cause the processor to, in response to receiving the request to communicate the email message, verify the identity of a sender by performing a multi-factor authentication.

14. The non-transitory computer-readable medium of claim 13, wherein the multi-factor authentication comprises at least two of:
   verifying login credentials associated with the sender;
   verifying a passcode sent to a sending computing device from which the email message is communicated; and
   verifying an identification associated with the sending computing device, wherein the identification comprises an Internet Protocol (IP) address, a Media Access Control (MAC) address, or a serial number associated with the sending computing device.

* * * * *